United States Patent
Hale et al.

(10) Patent No.: US 12,459,871 B2
(45) Date of Patent: Nov. 4, 2025

(54) EUTECTIC METAL ALLOY-CONTAINING CEMENT AND METHODS OF USE THEREOF

(71) Applicant: ARAMCO SERVICES COMPANY, Houston, TX (US)

(72) Inventors: Arthur Hale, Angleton, TX (US); Peter Boul, Houston, TX (US); Ahmed Said Abdelaziz Amer, Katy, TX (US)

(73) Assignees: SAUDI ARABIAN OIL COMPANY, Dhahran (SA); NEWPARK DRILLING FLUIDS, LLC, Katy, TX (US)

( * ) Notice: Subject to any disclaimer, the term of this patent is extended or adjusted under 35 U.S.C. 154(b) by 0 days.

(21) Appl. No.: 18/459,139

(22) Filed: Aug. 31, 2023

(65) Prior Publication Data

US 2025/0074834 A1   Mar. 6, 2025

(51) Int. Cl.
| C09K 8/467 | (2006.01) |
| C04B 14/34 | (2006.01) |
| C04B 41/00 | (2006.01) |
| C09K 8/42  | (2006.01) |
| C04B 111/72 | (2006.01) |

(52) U.S. Cl.
CPC .......... *C04B 41/0018* (2013.01); *C04B 14/34* (2013.01); *C04B 41/0081* (2013.01); *C09K 8/428* (2013.01); *C09K 8/467* (2013.01); *C04B 2111/72* (2013.01); *C04B 2201/50* (2013.01)

(58) Field of Classification Search
CPC . C09K 8/42; C09K 8/428; C09K 8/46; C09K 4/467; C09K 8/487; C04B 41/00; C04B 41/0072; C04B 41/0081; C04B 14/34; C04B 2111/72; C04B 2201/50; E21B 33/00; E21B 33/13
See application file for complete search history.

(56) References Cited

U.S. PATENT DOCUMENTS 6,384,389 B1 * 5/2002 Spencer ................ E21B 33/138
166/60
6,828,531 B2   12/2004 Spencer
(Continued)

FOREIGN PATENT DOCUMENTS

| CN | 114656183 A | 6/2022 |
| RU | 2508178 C2  | 2/2014 |

(Continued)

OTHER PUBLICATIONS

H. Zhang et al. "Evaluation of Bismuth-Tin Alloy for Well Plug and Abandonment." SPE Production & Operations, Feb. 17, 2020, vol. 35, No. 01, pp. 111-124 (14 pages).

(Continued)

*Primary Examiner* — Angela M DiTrani Leff
(74) *Attorney, Agent, or Firm* — Osha Bergman Watanabe & Burton LLP

(57) ABSTRACT

A method for remediating fractures in a cement structure including heating the cement structure to a temperature at or above the melting temperature of the eutectic metal alloy particles to allow the particles to flow in liquid state into the fractures in the cement structure until the heat source is discontinued, allowing the particles to cool and solidify.

9 Claims, 3 Drawing Sheets

(56) References Cited

U.S. PATENT DOCUMENTS

| | | | | |
|---|---|---|---|---|
| 6,923,263 | B2* | 8/2005 | Eden | C09K 8/42 166/179 |
| 7,124,820 | B2 | 10/2006 | Wardlaw | |
| 7,152,657 | B2* | 12/2006 | Bosma | E21B 43/106 166/380 |
| 7,249,630 | B2 | 7/2007 | Wardlaw | |
| 7,934,552 | B2 | 5/2011 | La Rovere | |
| 10,160,896 | B2 | 12/2018 | Weaver et al. | |
| 10,273,778 | B2* | 4/2019 | Billingham | E21B 36/008 |
| 10,316,601 | B2 | 6/2019 | Walton et al. | |
| 10,316,612 | B2 | 6/2019 | Shafer | |
| 10,550,663 | B2 | 2/2020 | Doherty | |
| 10,717,675 | B2 | 7/2020 | Bugajski | |
| 11,352,547 | B2* | 6/2022 | Pearl, Jr. | E21B 33/138 |
| 11,506,014 | B1* | 11/2022 | Zhang | E21B 36/008 |
| 2004/0084442 | A1* | 5/2004 | La Rovere | E21B 33/14 219/643 |
| 2004/0149418 | A1* | 8/2004 | Bosma | E21B 36/00 164/98 |
| 2006/0144591 | A1* | 7/2006 | Gonzalez | E21B 29/10 166/57 |
| 2010/0006289 | A1 | 1/2010 | Spencer | |
| 2018/0148991 | A1* | 5/2018 | Hearn | H01L 25/50 |
| 2018/0298715 | A1* | 10/2018 | Shafer | C09K 8/426 |
| 2021/0156222 | A1* | 5/2021 | Shafer | E21B 33/134 |
| 2021/0222047 | A1* | 7/2021 | Pearl, Jr. | C09K 8/03 |
| 2024/0059957 | A1* | 2/2024 | Amer | C09K 8/516 |

FOREIGN PATENT DOCUMENTS

| | | |
|---|---|---|
| WO | 2003035569 A1 | 5/2003 |
| WO | 2019151870 A1 | 8/2019 |
| WO | 2019/194899 A1 | 10/2019 |
| WO | 2021/145897 A1 | 7/2021 |
| WO | 2022/087002 A1 | 4/2022 |

OTHER PUBLICATIONS

T. Vralstad et al., "Plug & abandonment of offshore wells: Ensuring long-term well integrity and cost-efficiency." Journal of Petroleum Science and Engineering, 2019, vol. 173, pp. 478-491 (14 pages).

S. Akbari et al., "Materials science application in plug and abandonment of oil and gas wells", CERMA, pp. 1-7, retrieved Apr. 5, 2024 (7 pages).

M. Khalifeh et al., "Chapter 4, Types of Permanant Plugging Materials", ResearchGate, 2020, pp. 97-136 (41 pages).

N. A. Makarov, "Sintering specifics of corundum ceramics modified with eutectic additives", Springer Link, Glass and Ceramics, Mar. 2006, vol. 63, Nos. 3-4, pp. 119-121 (3 pages).

Z. Lei et al., "Bonding of Cf/SiC composite to Invar alloy using an active cement, Ag—Cu eutectic and Cu interlayer", Applied Surface Science, vol. 258, Issue 24, Jun. 27, 2012, pp. 10053-110057 (5 pages).

International Search Report issued for corresponding international patent application No. PCT/US2024/043837, mailed Dec. 19, 2024 (6 pages).

Written Opinion issued for corresponding international patent application No. PCT/US2024/043837, mailed Dec. 19, 2024 (10 pages).

* cited by examiner

EUTECTIC METAL ALLOY-CONTAINING CEMENT AND METHODS OF USE THEREOF

BACKGROUND

Oil well cement additive chemistry is fundamentally important to oil well construction and to ensuring zonal isolation throughout the life of an oil well. When sealing the casing to the wellbore formation with cement, oil well cement additives regulate many important slurry properties including rheology, suspension stability, cement slurry fluid loss control, set time, and mechanical properties of the set cement. Poor engineering of oil well cement slurries can result in the loss of zonal isolation in a well which is a considerable hazard to field personnel and can potentially result in loss of the well. The appropriate selection of additives in cement slurries depends on the temperature and pressure profiles down the length of the well, the depth of the well, the geological formations that the slurry contacts, as well as the presence of gas, water, and oil in the different zones of the well. The understanding of cement chemistry and cement additive chemistry is critically important for the appropriate design of oil well cements used in wells with these well-specific parameters.

There are many kinds of cement additives used in oil well cementing. The additives can be classified by the function that they impart into the cement as it relates to oil well cementing operations. For example, fluid loss control additives are typically polymeric species that prevent the loss of water from the cement slurry into the rock formations surrounding the cement where it is placed. The additives most used in oil well cementing are accelerators, fluid loss control additives, suspension aid additives, and retarders. Retarding additives are added to cement slurries to delay the setting (hydration) time of the cement. This is very important in oil well cement where the different thermal conditions in the well can give correspondingly different set times. Additionally, the cement in slurry form is pumped into the well from the surface, and the time required for accurate placements varies from well to well and zone to zone.

One of the most significant problems in oil and gas well construction is annular pressure buildup (APB). APB arises because of fracturing of the set well cement in the form of microfractures, microannuli, and debonding from the casing and/or formation. These problems are expensive, costing the industry billions of dollars a year in well remediation costs and lost production costs. Such problems can also present a potential safety hazard to field personnel. Thus, additives which are included in the well cement which can prevent or remediate fractures in cement at minimal cost, are highly valued.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a cement composition containing a cement precursor and eutectic metal alloy particles. In another aspect, embodiments disclosed herein relate to a method of remediating fractures in a cement structure by heating the cement structure to a temperature at or above the melting temperature of the eutectic metal alloy particles to allow the particles to flow into the fractures of the cement structure until the heat source was discontinued and allowed the particles to cool and solidify.

Other aspects and advantages of the claimed subject matter will be apparent from the following description and the appended claims.

DETAILED DESCRIPTION

Figure 1:
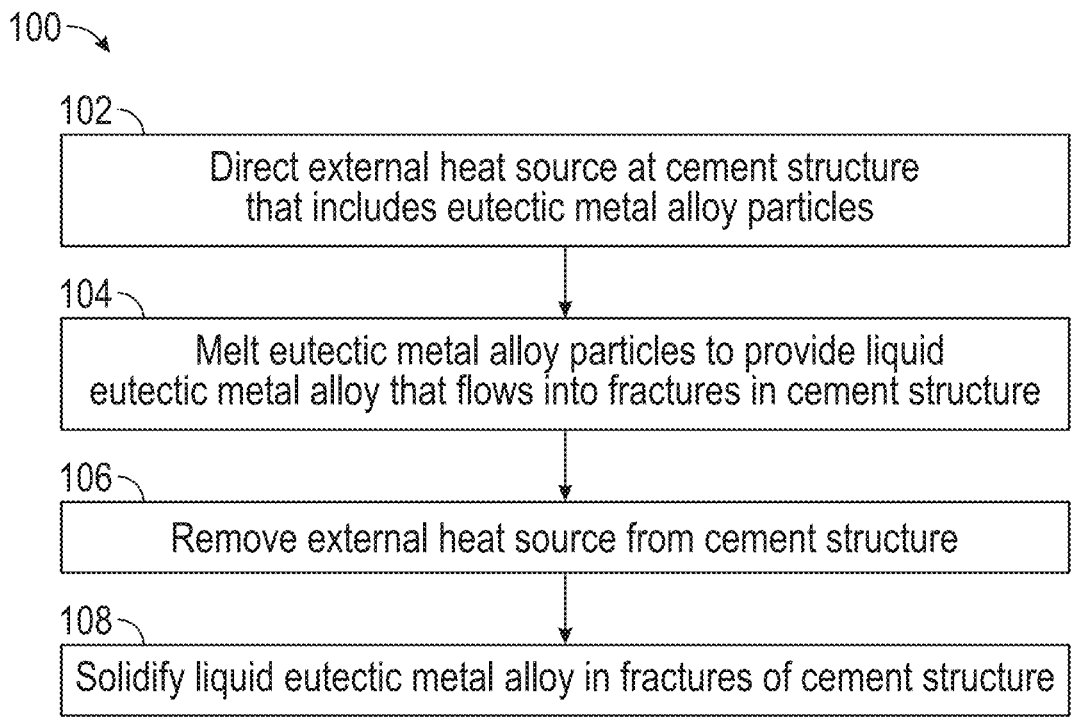
FIG. 1 is a block-flow diagram of a method in accordance with one or more embodiments of the present disclosure.

The present disclosure generally relates to a cement composition and a method of remediating fractures in a structure comprising the cement composition. The cement composition may include an additive that may prevent or remediate fractures formed in the cement. Thus, one or more embodiments in accordance with the present disclosure provide an effective solution for addressing fractures in cement structure, in particular, cement structures formed in a high-pressure environment, such as a downhole environment.

Cement Composition

In one aspect, embodiments disclosed herein relate to a cement composition. The cement composition may include an additive capable of preventing or remediating, or both, fractures in cured cement. In one or more embodiments, the additive included in the cement composition is eutectic metal alloy particles. Suitable eutectic metal alloy particles may include one or more metals such as lead, tin, bismuth, cadmium, and indium, among others. In particular embodiments, the cement composition includes eutectic metal alloy particles including tin and bismuth.

The eutectic metal alloy particles included in a cement composition in accordance with the present disclosure may have an average particle size ranging from 100 to 1,000 microns. For example, in one or more embodiments, the eutectic metal alloy particles have an average particle size ranging from a lower limit of one of 100, 200, 300, 400, and 500 microns to an upper limit of one of 500, 600, 700, 800, 900, and 1,000 microns, where any lower limit may be paired with any mathematically compatible upper limit.

As described above, the eutectic metal alloy particles are included in the cement as an additive capable of preventing or remediating, or both, fractures in a cured cement structure. The eutectic metal alloy particles may act as such an additive by, upon exposure to heat, melting and flowing into fractures or microfractures formed in the cured cement, and subsequently cooling and solidifying to provide a reinforced cement structure. Accordingly, the eutectic metal alloy particles may be solid at elevated temperature such that they maintain their form under various ambient conditions including downhole conditions. Suitable eutectic metal alloy particles may have a melting point ranging from 45 to 280° C. For example, in one or more embodiments, the cement composition may include eutectic metal alloy particles having a melting point ranging from a lower limit of one of 45, 50, 75, 100, 120, and 150° C. to an upper limit of one of 160, 180, 200, 220, 240, 260, and 280° C., where any lower limit may be paired with any mathematically compatible upper limit. In some embodiments, the eutectic metal alloy particles have a melting temperature ranging from 100 to 280° C.

Cement compositions in accordance with one or more embodiments include eutectic metal alloy particles in an amount ranging from 1% to 50% by weight.

In one or more embodiments, the cement composition includes a cement precursor. The cement precursor may be any material that when mixed with water can be cured into a cement. The cement precursor may be hydraulic or non-hydraulic. Suitable cement precursors include, but are not limited to, ordinary Portland cement, Saudi cement, calcium solphoaluminate cement, and cements made from a mixture of lime, gypsum, plasters, and oxychloride. In some embodiments, the cement precursor is ordinary Portland cement, calcium sulphoaluminate cement, or a combination thereof. High eutectic metal alloy (EMA) concentrations in the cement yields a low Young's modulus and an improved ductility following heating.

Cement compositions may include a cement precursor in an amount ranging from 5 to 50 wt %, based on the total weight of the composition. For example, in one or more embodiments, a cement composition includes a cement precursor in an amount ranging from a lower limit of one of 15, 16, 17, 18, 19, and 20 wt % to an upper limit of one of 25, 27, 30, 32, 35, 37, and 40 wt %, where any lower limit may be paired with any mathematically compatible upper limit.

In one or more embodiments, the cement composition includes various other additives. Suitable additives that may be included in cement composition according to the present disclosure include, but are not limited to, lost circulation materials, retarders, viscosifiers, accelerators, fluid loss agents, and combinations thereof. Such additives may be present in the cement composition in an amount ranging from 0.05% by weight of cement (BWOC) to 5% by weight of cement.

Method of Fracture Remediation

In another aspect, embodiments disclosed herein relate to a method of remediating or preventing fracture formation in cured cement, such as cement structures in oil wells. The method may include heating the cement structure to a temperature sufficient to melt the eutectic metal alloy particles that are present in the cement composition. This heating allows the melted eutectic metal alloy to flow into fractures formed in the cement structure. The melted eutectic metal alloy is then cooled, resulting in solidification of the eutectic metal alloy within the fractures. As such, disclosed methods may provide efficient repair of fractured cement structures.

A method, 100, in accordance with one or more embodiments of the present disclosure is shown in, and discussed with reference to, FIG. 1. Notably, method 100 may be applied to cement structures that are prepared from a cement composition as previously described. Such cement structures may be oil well cement structures. Accordingly, cement compositions in accordance with one or more embodiments may be pumped downhole and cured as any conventional cement composition. In one or more embodiments, a cement composition is pumped downhole and cured to form a well casing.

Figure 2:
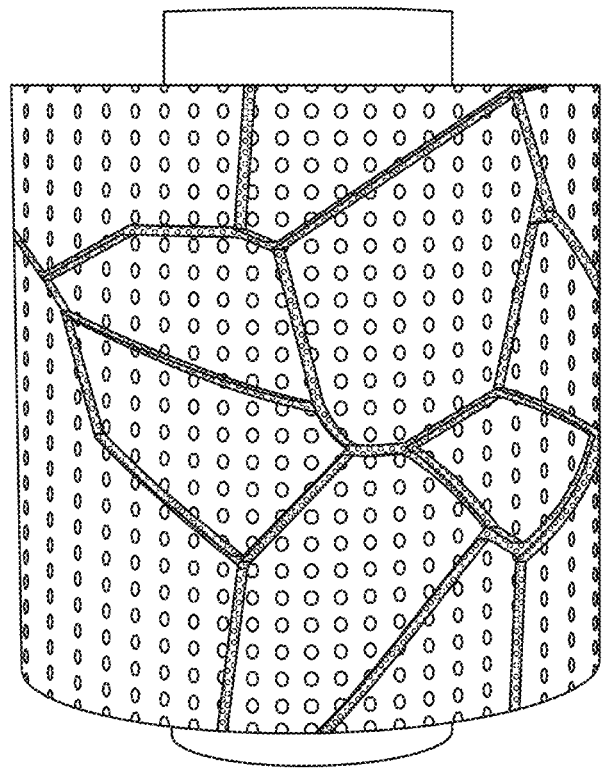
FIG. 2 is a schematic depiction of a cement structure in accordance with one or more embodiments of the present disclosure.

Upon formation of a fracture or microfracture in the cement structure, the fracture may be repaired according to method 100. Such cement structure, including eutectic metal alloys, that has fractures or microfractures is shown in FIG. 2. Referring back to FIG. 1, a method of remediating fractures in a cement structure prepared from a cement composition of one or more embodiments initially includes using an external heat source to heat the cement structure 102. Suitable external heat sources include, but are not limited to, mineral insulated heaters and thermite heaters. In one or more embodiments, the external heat source is lowered into a wellbore so as to be directed at the cement structure. In such embodiments, the external heat source may be connected to topside equipment and lowered into a well using wireline. The length of the wireline may be chosen to enable lowering of the external heat source to a target depth of the well where fractures or microfractures have formed in the well casing or other downhole cement structures.

The external heat source may be used to heat the cement structure causing the eutectic metal alloy particles that are part of the cement to melt. As such, the external heat source may be configured to heat the cement structure to a temperature ranging from about 45 to 280° C. In one or more embodiments, for example, the external heat source is configured to heat a cement structure containing eutectic metal alloy particles to a temperature ranging from a lower limit of one of 45, 50, 75, 100, 125, and 150° C. to an upper limit of one of 160, 180, 200, 220, 240, 260, and 280° C., where any lower limit may be paired to any mathematically compatible upper limit. In particular embodiments, the external heat source heats the cement structure to a temperature ranging from about 100 to about 280° C.

The external heat source may be directed at the cement structure for a sufficient amount of time to allow the eutectic metal alloy particles to melt. A sufficient amount of time may range from a minute to 5 hours depending on heater location.

In method 100, the heat from the external heat source melts the eutectic metal alloy particles that are present in the cement structure to provide liquid eutectic metal alloy 104. In one or more embodiments, the liquid eutectic metal alloy flows into fractures or microfractures formed in the cement structure such that the liquid completely fills the fractures or microfractures.

After melting the eutectic metal alloy, the external heat source may be removed from the cement structure 106 and heating discontinued. The external heat source may be removed from the well using the connected wireline. For example, topside equipment may be used to reel in the wireline to efficiently remove the external heat source from the well and thus, allowing the cement structure containing the liquid eutectic metal alloy to cool and solidify.

Figure 3:
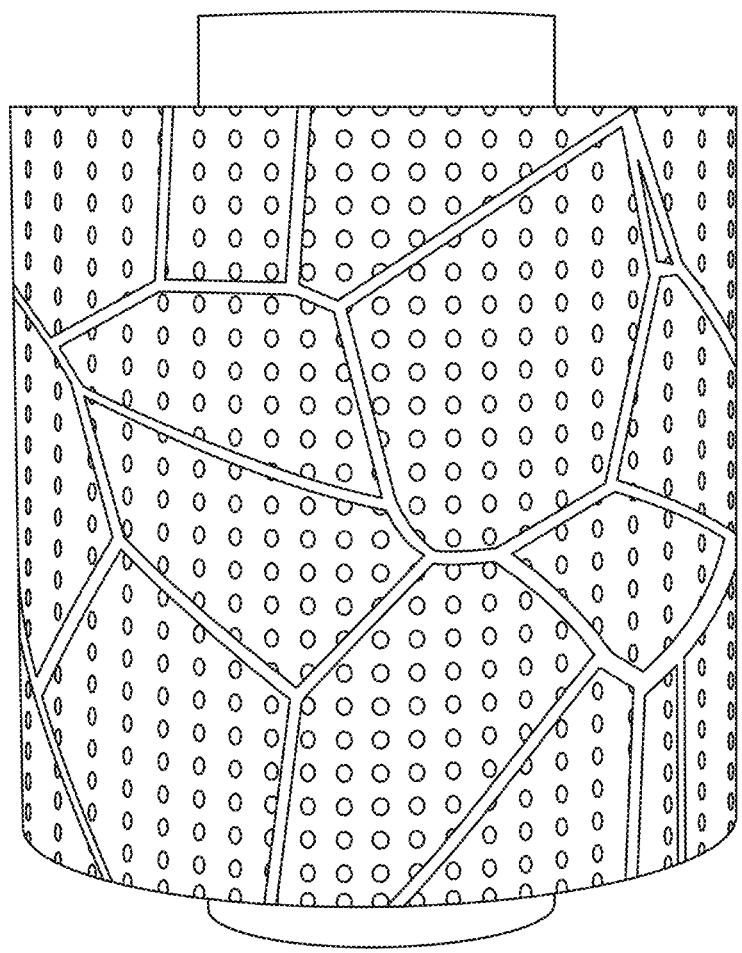
FIG. 3 is a schematic depiction of a cement structure in accordance with one or more embodiments of the present disclosure.

Once the external heat source is removed and the cement structure cools, method 100 includes solidifying the liquid eutectic metal alloy inside the fractures or microfractures of the cement structure 108. As such, method 100 may provide a reinforced cement structure. In one or more particular embodiments, method 100 provides a reinforced well casing. The well casing may be reinforced in that fractures or microfractures within the well casing may be filled with solidified eutectic metal alloy and, as such, the casing may be repaired. FIG. 3 shows an exemplary reinforced cement structure, similar to that of a well casing.

Examples

A proof of concept is provided herein using a eutectic bismuth-tin alloy that has a melting point of about 140° C.

A cement slurry including 15.8 pound per gallon (ppg) of Saudi G cement containing 20% by weight of cement (bwoc) bismuth-tin (BiSn) alloy (with a measured melting point of 140° C.) was prepared. The cement was blended, per API protocol, and poured into brass molds with a diameter of 2″ and a length of 5″. The cement was then cured in a chamber at 180° F. for 43 hours at 3000 psi. The molds were then removed from the curing chamber, CT Scanned, and measured for permeability.

Figure 4A:
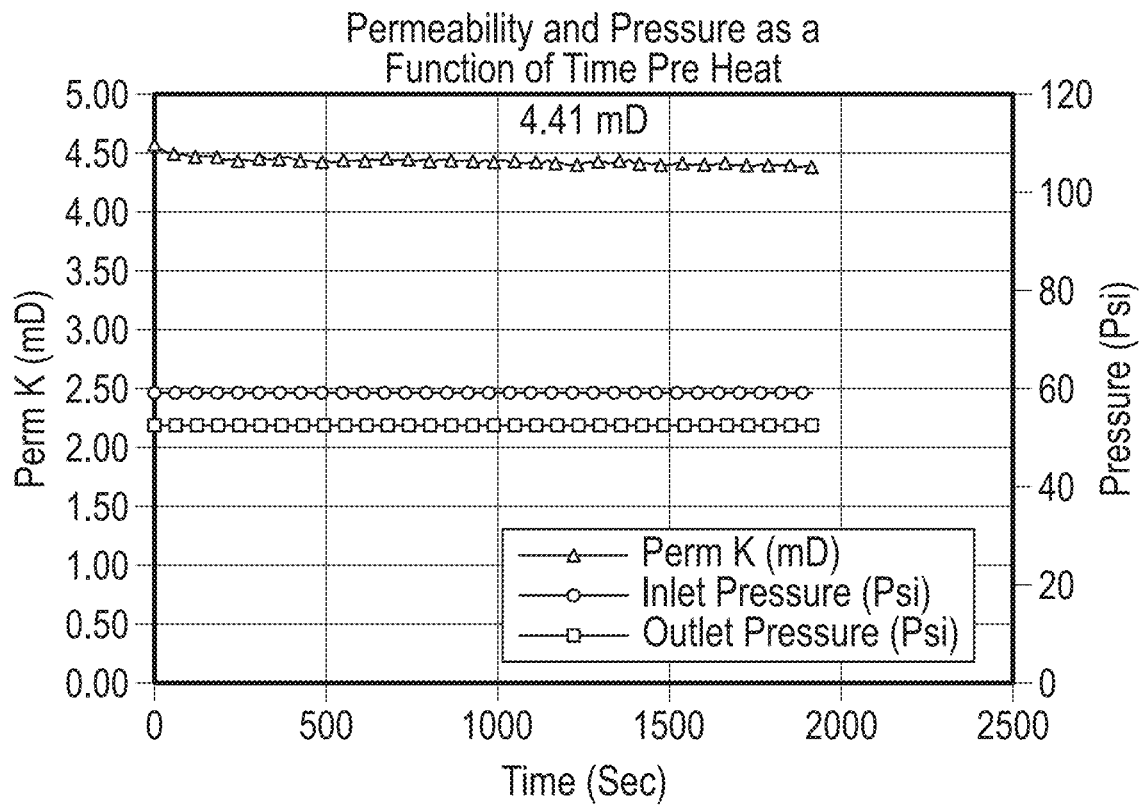
FIGS. 4A and 4B are graphical representations of the permeability of a cement structure in accordance with one or more embodiments of the present disclosure.
Figure 4B:
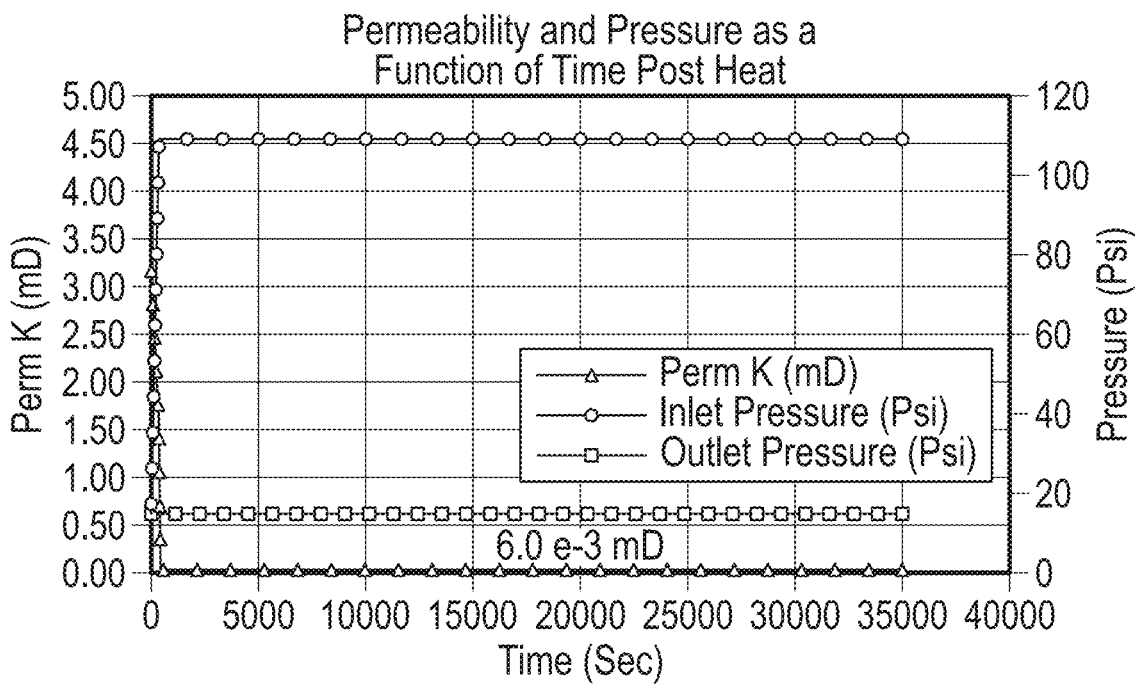

It was found that the bismuth-tin alloy, when added to cement, endowed the cured cement with a unique functionality which can be useful in sealing fractures potentially preventing annular pressure build-up (APB). When a sample of a fractured cement containing a bismuth-tin alloy in its formulation was heated to 150° C., the alloy melted and filled the voids in the fracture. This result was determined through a carefully controlled experiment wherein the permeability of the fractured cement was measured at room temperature before and after heating to 150° C., shown in FIGS. 4A and 4B, respectively. After heating, the permeability of the sample dropped by three orders of magnitude (from millidarcy to microDarcy permeability).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method of remediating fractures in a cement structure comprising a cement composition comprising solid eutectic metal alloy particles, the method comprising:
   pumping the cement composition comprising solid eutectic metal alloy particles downhole;
   curing the cement composition comprising the solid eutectic metal alloy particles downhole to provide the cement structure comprising solid eutectic metal alloy particles;
   then heating the cement structure and the cement composition with an external heat source to a temperature at or above a melting temperature of the solid eutectic metal alloy particles;
   melting the solid eutectic metal alloy particles within the cement composition to provide liquid eutectic metal alloy, thereby allowing flow of the liquid eutectic metal alloy into fractures in the cement structure;
   discontinuing heating the cement structure; and
   cooling and solidifying the liquid eutectic metal alloy in the fractures of the cement structure, wherein the solid eutectic metal alloy particles are present in a concentration ranging from 1 to 50 wt % based on the cement composition.

2. The method of claim 1, wherein the solid eutectic metal alloy particles comprise one or more selected from the group consisting of lead, tin, bismuth, cadmium, and indium.

3. The method of claim 2, wherein the solid eutectic metal alloy particles comprise bismuth and tin.

4. The method of claim 1, wherein the solid eutectic metal alloy particles have an average particles size ranging from 100 to 3,000 microns.

5. The method of claim 1, wherein the melting temperature of the solid eutectic metal alloy particles ranges from 45° C. to 280° C.

6. The method of claim 5, wherein the melting temperature of the solid eutectic metal alloy particles ranges from 100° C. to 280° C.

7. The method of claim 5, wherein the cement structure is a well casing.

8. The method of claim 5, wherein the external heat source is a mineral insulated heater or a thermite heater.

9. The method of claim 1, further comprising mixing a cement precursor with the cement composition.

* * * * *